US012695963B2

(12) United States Patent
Mujtaba et al.

(10) Patent No.: US 12,695,963 B2
(45) Date of Patent: *Jul. 28, 2026

(54) PERSONALIZED SEMANTIC FAST-FORWARD VIDEOS FOR NEXT GENERATION STREAMING PLATFORMS

(71) Applicant: Adeia Guides Inc., San Jose, CA (US)

(72) Inventors: Ghulam Mujtaba, Gyeonggi-do (KR); Eun Seok Ryu, Jongno-gu (KR); Reda Harb, Saint Petersburg, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,257

(22) Filed: Nov. 8, 2024

(65) Prior Publication Data

US 2025/0071396 A1      Feb. 27, 2025

Related U.S. Application Data

(63) Continuation of application No. 17/899,292, filed on Aug. 30, 2022, now Pat. No. 12,177,541.

(51) Int. Cl.
| | |
|---|---|
| *H04N 21/8549* | (2011.01) |
| *G11B 27/00* | (2006.01) |
| *H04N 21/45* | (2011.01) |
| *H04N 21/466* | (2011.01) |
| *H04N 21/845* | (2011.01) |

(52) U.S. Cl.
CPC ....... *H04N 21/8549* (2013.01); *G11B 27/005* (2013.01); *H04N 21/4532* (2013.01); *H04N 21/4668* (2013.01); *H04N 21/8456* (2013.01)

(58) Field of Classification Search
CPC ........... H04N 21/8549; H04N 21/4532; H04N 21/4668; H04N 21/8456; H04N 21/440263; H04N 21/472; G11B 27/005
See application file for complete search history.

(56) References Cited

U.S. PATENT DOCUMENTS

| | | | |
|---|---|---|---|
| 8,850,471 B2 | 9/2014 | Kilar et al. | |
| 10,455,297 B1 * | 10/2019 | Mahyar .............. | H04N 21/4532 |
| 12,177,541 B2 * | 12/2024 | Mujtaba .............. | H04N 21/4532 |
| 2007/0154165 A1 * | 7/2007 | Hemmeryckx-Deleersnijder ....... | H04N 21/234381 386/343 |
| 2007/0204238 A1 | 8/2007 | Hua et al. | |
| 2013/0166587 A1 | 6/2013 | Berry | |
| 2016/0170985 A1 | 6/2016 | Lewis et al. | |

(Continued)

FOREIGN PATENT DOCUMENTS

KR      20230001453 A  *  1/2023  ......... H04N 21/4347

*Primary Examiner* — John R Schnurr
(74) *Attorney, Agent, or Firm* — HG LAW LLP

(57) ABSTRACT

Systems and methods are provided herein for generating a summary for a piece of content using a thumbnail container. This may be accomplished by a system receiving a thumbnail container related to a piece of content. The system may also receive user information, a device characteristic, and/or content information related to the piece of content and use the received data to select a machine learning model. The selected machine learning model can identify one or more thumbnails of the thumbnail container as a thumbnail of interest to a user. The system can then generate a summary of the piece of content based on the thumbnail identified by the machine learning model and display the generated summary for the user.

20 Claims, 8 Drawing Sheets

(56) References Cited

U.S. PATENT DOCUMENTS

| | | | |
|---|---|---|---|
| 2017/0251274 A1 | 8/2017 | Fujii et al. | |
| 2018/0005666 A1* | 1/2018 | Yang | G06T 7/97 |
| 2020/0021873 A1* | 1/2020 | Swaminathan | G06N 3/09 |
| 2021/0136467 A1* | 5/2021 | Kim | G06N 3/09 |
| 2021/0303864 A1* | 9/2021 | Zhao | G06V 40/172 |
| 2023/0040678 A1 | 2/2023 | Karlin et al. | |
| 2023/0069178 A1 | 3/2023 | Sen et al. | |
| 2024/0073493 A1 | 2/2024 | Mujtaba et al. | |
| 2024/0267601 A1* | 8/2024 | Lemieux | G06N 3/045 |
| 2025/0024097 A1* | 1/2025 | Dong | H04N 21/8549 |

* cited by examiner

200

300

500

510

USER INPUT
INTERFACE

512

DISPLAY

514

SPEAKERS

516

MICROPHONE

506

PROCESSING
CIRCUITRY

504

508

STORAGE
(E.G., RAM, ROM,
HARD DISK,
REMOVABLE DISK,
ETC.)

502

<u>600</u>

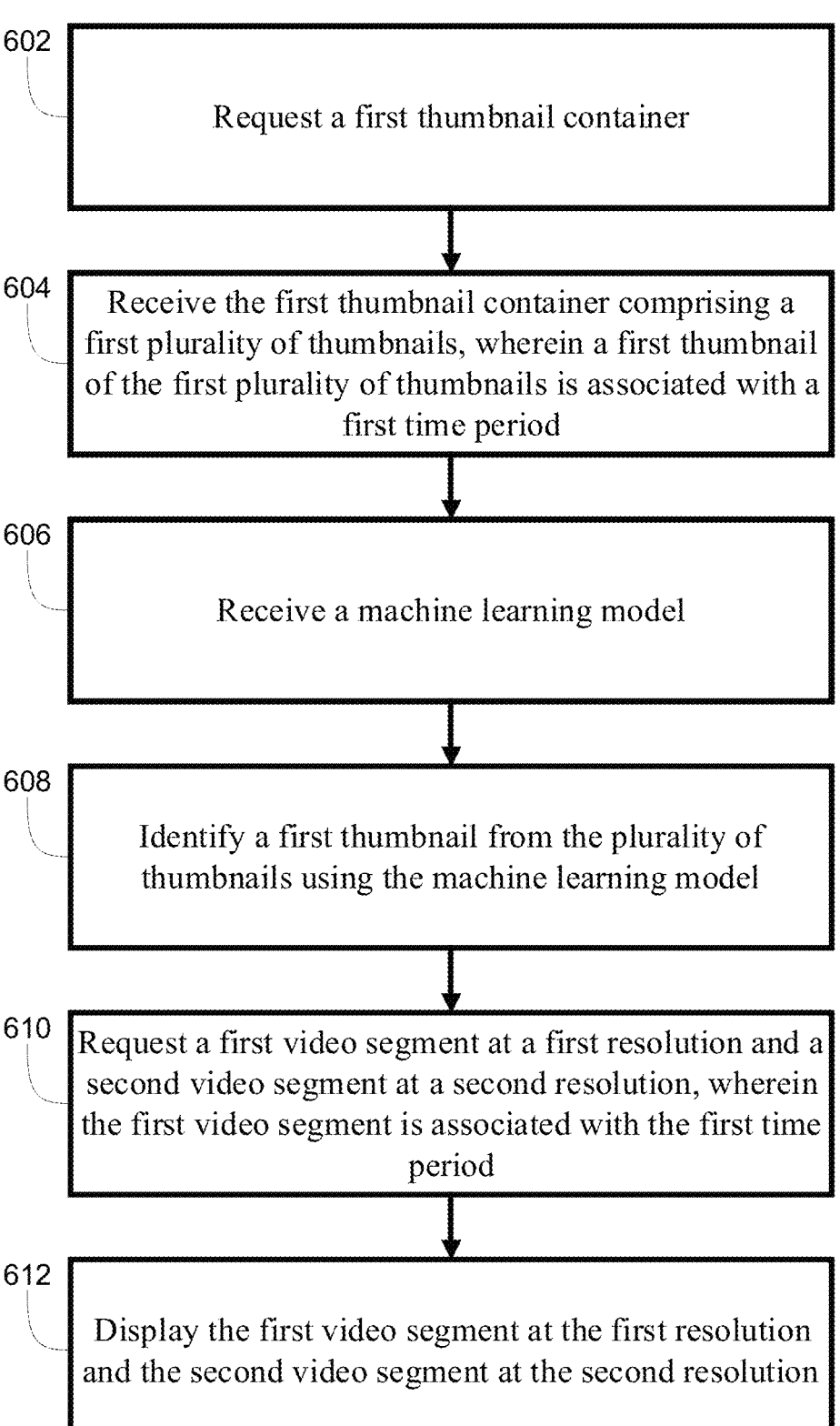

602 — Request a first thumbnail container

604 — Receive the first thumbnail container comprising a first plurality of thumbnails, wherein a first thumbnail of the first plurality of thumbnails is associated with a first time period 606 — Receive a machine learning model 608 — Identify a first thumbnail from the plurality of thumbnails using the machine learning model 610 — Request a first video segment at a first resolution and a second video segment at a second resolution, wherein the first video segment is associated with the first time period 612 — Display the first video segment at the first resolution and the second video segment at the second resolution

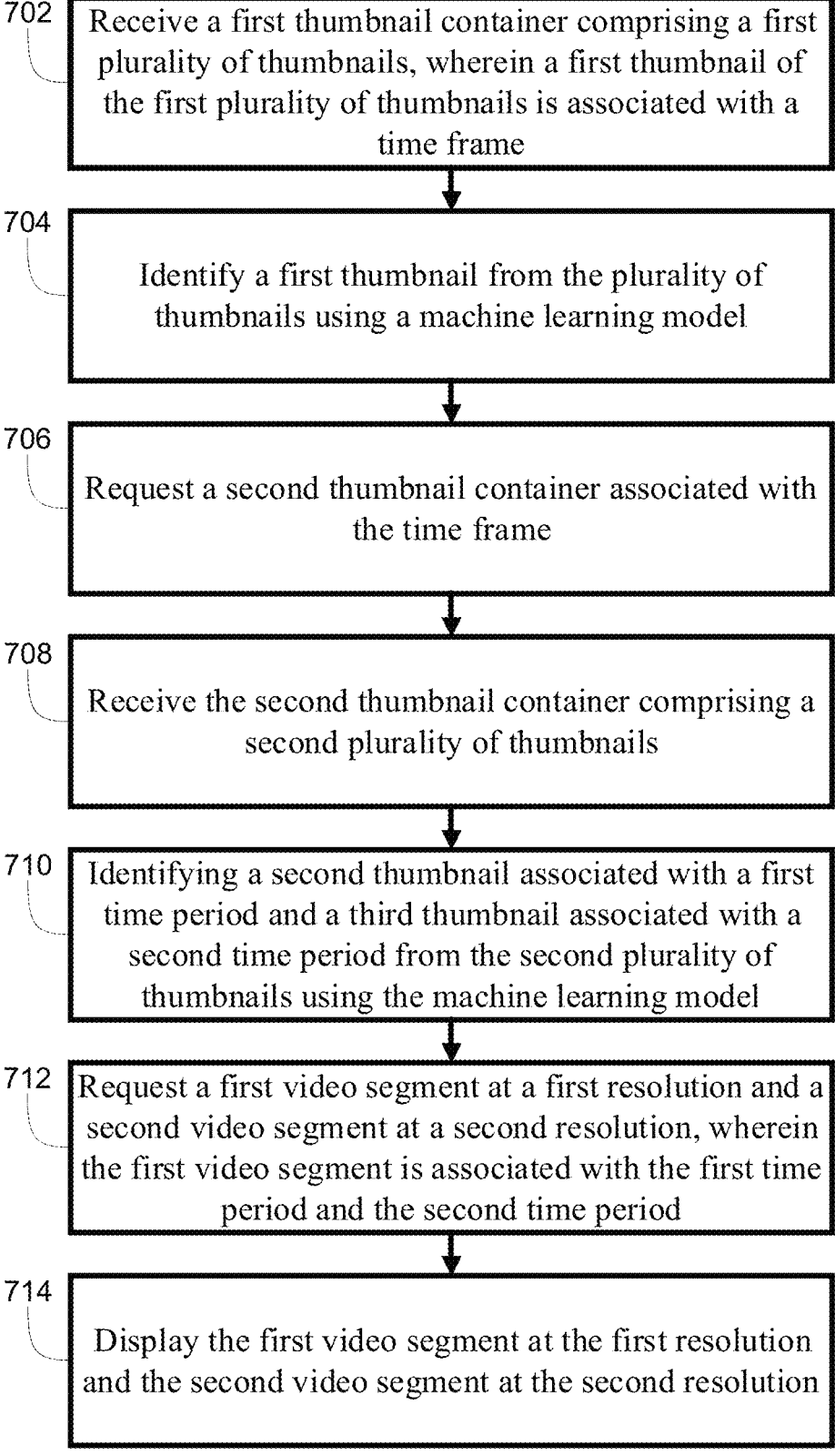

702  Receive a first thumbnail container comprising a first plurality of thumbnails, wherein a first thumbnail of the first plurality of thumbnails is associated with a time frame 704  Identify a first thumbnail from the plurality of thumbnails using a machine learning model 706  Request a second thumbnail container associated with the time frame 708  Receive the second thumbnail container comprising a second plurality of thumbnails 710  Identifying a second thumbnail associated with a first time period and a third thumbnail associated with a second time period from the second plurality of thumbnails using the machine learning model 712  Request a first video segment at a first resolution and a second video segment at a second resolution, wherein the first video segment is associated with the first time period and the second time period 714  Display the first video segment at the first resolution and the second video segment at the second resolution

FIG. 7

PERSONALIZED SEMANTIC FAST-FORWARD VIDEOS FOR NEXT GENERATION STREAMING PLATFORMS

CROSS-REFERENCE TO RELATED APPLICATION

This application is a continuation of U.S. patent application Ser. No. 17/899,292, filed Aug. 30, 2022, the disclosure of which is incorporated by reference in its entirety.

BACKGROUND

The present disclosure relates to video summarization, and in particular to techniques for generating a summary for a piece of content.

SUMMARY

The amount of media content available online continues to grow as more and more content is uploaded every minute. The ever-growing amount of media content makes it increasingly difficult for users to navigate to media content of interest. Accordingly, there is an increasing demand for technologies that allow users to efficiently determine whether a piece of content is aligned with their interests and/or preferences. Streaming platforms (e.g., Netflix, Hulu, Amazon Prime, etc.) employ centralized server-based personalized video summarization technologies to overcome the information overload experienced by many users. However, current video summarization technologies have a number of shortcomings. Server-side techniques experience a huge computational load trying to collect and process information (e.g., real-time user interactions, metadata associated with the media content, user histories, etc.). Many server-side techniques also lack transparency in managing and processing users' data. Further, the summaries generated using these techniques often fail to account for user-specific preferences. In view of these deficiencies, there exists a need to better generate a summary for a piece of content.

Techniques are disclosed herein for generating a summary for a piece of content using a thumbnail container. In some embodiments, a user may be browsing content using a first device (e.g., smartphone, laptop, desktop, tablet, television, etc.) and request a summary of a piece of content. The first device can send a summary request to a second device (e.g., a server). In response to the summary request, the second device can provide one or more thumbnail containers comprising a plurality of thumbnails to the first device. Each thumbnail of the plurality of thumbnails may relate to a time period of the piece of content. For example, if the piece of content is a two-hour movie, then the thumbnail container may comprise 120 thumbnails, wherein each thumbnail relates to a different minute of the piece of content.

The first device can use a machine learning model to identify one or more thumbnails of the plurality of thumbnails. The machine learning model may identify the one or more thumbnails based on the user's preferences. For example, if the user has a preference for animals, then the machine learning model may identify thumbnails that display an animal. The first device then requests one or more additional thumbnail containers based on the time period associated with the one or more thumbnails identified by the machine learning model. For example, a first thumbnail identified by the machine learning model may correspond to minute 12 of the piece of content and a second thumbnail identified by the machine learning model may correspond to minute 28 of the piece of content. The first device may request a first additional thumbnail container comprising thumbnails between minute 10 and minute 15 of the piece of content and a second additional thumbnail container comprising thumbnails between minute 25 and minute 30 of the piece of content. The additional thumbnail containers may comprise a second plurality of thumbnails. The second plurality of thumbnails may relate to time periods of the piece of content, wherein the time between each thumbnail of the second plurality of thumbnails is less than the time between each thumbnail of the first plurality of thumbnails. For example, each thumbnail of the first plurality of thumbnails may be one minute apart and each thumbnail of the second plurality of thumbnails may be five seconds apart. The first device may repeat this process until the first device identifies a plurality of time frames of the piece of the content that are aligned with the user's preferences.

The first device may then request a plurality of segments of the piece of content from the second device, wherein the plurality of segments correspond to the one or more time frames identified by the first device. For example, the first device may request a first segment of the piece of content from 11 minutes 28 seconds to 13 minutes 12 seconds and a second segment of the piece of content from 27 minutes 48 seconds to 28 minutes 11 seconds. The first device then displays a summary comprising the received plurality of segments to the user. In some embodiments, the first device requests a first plurality of segments of the piece of content from the second device at a first resolution and requests a second plurality of segments of the piece of content from the second device at a second resolution. The first plurality of segments may correspond to the time frames identified using the machine learning model. Accordingly, the first resolution may be higher than the second resolution because the first plurality of segments will be used to generate the summary of the piece of content. The first device may provide different types of summaries of the piece of content. For example, the first device may generate a summary where segments of the piece of content of a higher resolution are played normally but segments of a lower resolution are fast-forwarded. In another example, the first device generates a summary comprising only the segments of the piece of content of the higher resolution. In some embodiments, the summary is generated with the aid of one or more methodologies described by G. Mujtaba and E.-S. Ryu, "Client-Driven Personalized Trailer Framework Using Thumbnail Containers," in IEEE Access, vol. 8, pp. 60417-60427, 2020, doi: 10.1109/ACCESS.2020.2982992, the entire disclosures of which is incorporated by reference.

The machine learning model used to identify the one or more thumbnails based on the user's preferences may be selected from a plurality of machine learning models. The first device may have access to a plurality of machine learning models. For example, the first device may be able to request one or more machine learning models from a database stored on the first device and/or some other device (e.g., second device). The first device may select a machine learning model based on one or more factors. The factors may include characteristics of the selected piece of content, specifications of the first device, location of the first device, user information, and similar such information. For example, a first machine learning model may be selected for a first piece of content that is a movie while a second machine learning model may be selected for a second piece of content that is a television show. In another example, a first machine learning model may be selected for a first device that is a smartphone while a second machine learning model may be selected for a second device that is a laptop. In another example, a first machine learning model may be selected for a first device in a first country and a second machine learning model may be selected for a second device in a second country. In another example, a first machine learning model may be selected for a first user with a first preference (e.g., romance) and a second machine learning model may be selected for a second user with a second preference (e.g., comedy).

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 6 is an illustrative flowchart of a process for generating a summary for a piece of content using a thumbnail container, in accordance with embodiments of the disclosure;

FIG. 7 is another illustrative flowchart of a process for generating a summary for a piece of content using a thumbnail container, in accordance with embodiments of the disclosure.

DETAILED DESCRIPTION

Figure 1:
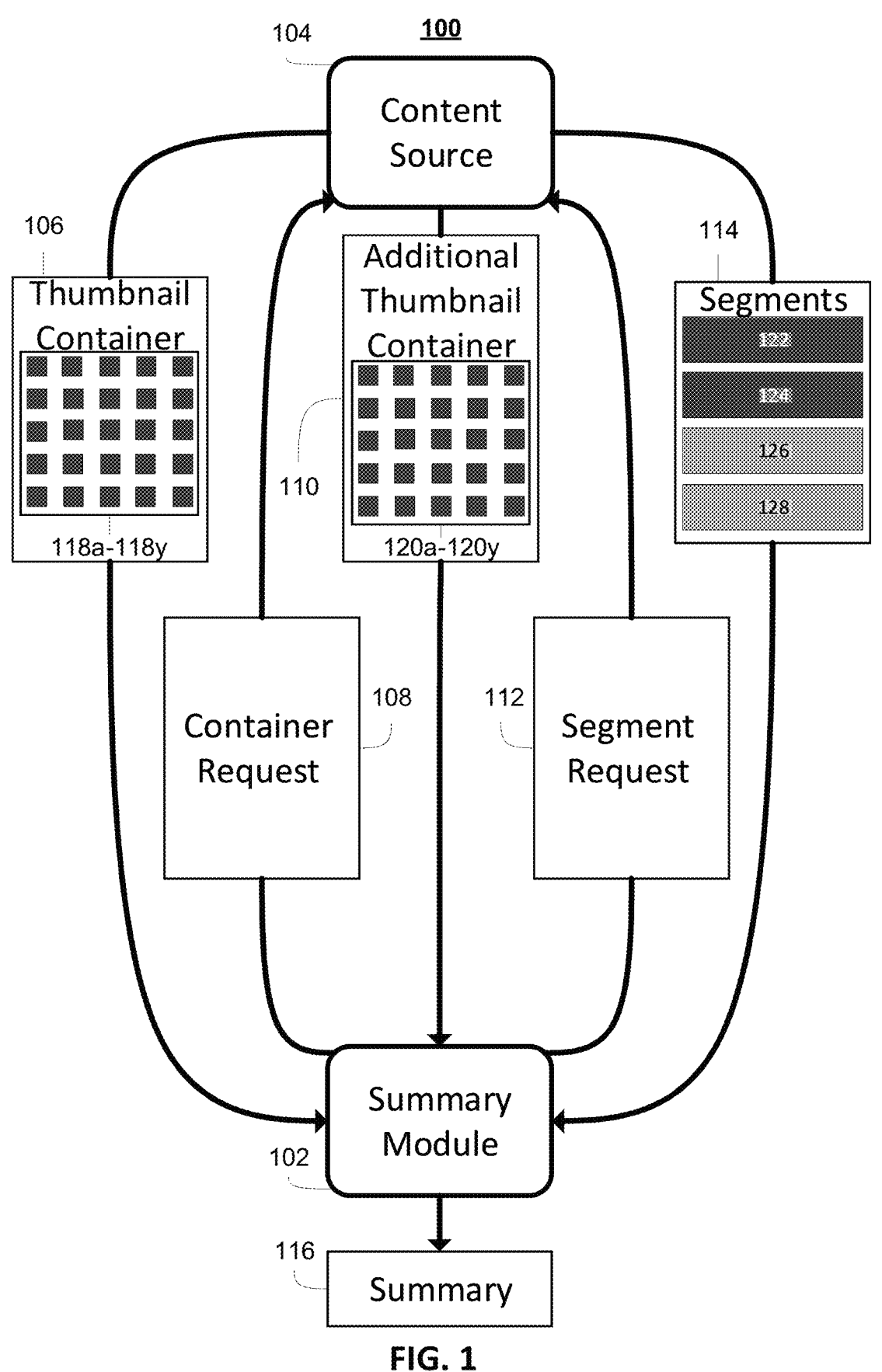
FIG. 1 shows an illustrative block diagram of a system for generating a summary for a piece of content using a thumbnail container, in accordance with embodiments of the disclosure.

FIG. 1 shows an illustrative diagram of a system 100 for generating a summary for a piece of content using a thumbnail container, in accordance with some embodiments of the disclosure. FIG. 1's system 100 comprises a summary module 102 and a content source 104. In some embodiments, the summary module 102 is stored on a first device (e.g., laptop) and the content source 104 is stored on a second device (e.g., server). In some embodiments, the summary module 102 and the content source 104 are stored on the same device. The content source 104 represents any computer-accessible source of content, such as a storage for audio content, metadata, or, similar such information.

In some embodiments, the summary module 102 receives a first thumbnail container 106 from the content source 104. In some embodiments, the content source 104 sends the first thumbnail container 106 in response to receiving a first request identifying the piece of content. For example, a user may be browsing content using a device and select an option to view a summary related to a piece of content. In response to the user's selection, the device may send the first request to the content source 104, wherein the first request identifies the piece of content. In another example, a device may send a request to the content source 104 based on one or more pieces of content recommended to the user. The pieces of content may be recommended to the user by the device or the content source 104. In some embodiments, the pieces of content may be recommended based on a user profile associated with the user. In some embodiments, the content source 104 automatically sends the first thumbnail container 106 along with a piece of content identifier. For example, the content source 104 may send a plurality of identifiers each corresponding to a piece of content to the summary module 102 and/or the device that the summary module is stored on. The content source 104 may also send a plurality of thumbnail containers for each piece of content associated with the plurality of identifiers.

In some embodiments, the first thumbnail container 106 comprises a first plurality of thumbnails 118a-118y. Although 25 thumbnails are shown, the first thumbnail container 106 may comprise more or less thumbnails. In some embodiments, each thumbnail of the first plurality of thumbnails 118a-118y may relate to a time period of the piece of content. For example, the piece of content may be 125 minutes long and each thumbnail of the first plurality of thumbnails 118a-118y may relate to a different five-minute increment of the piece of content. In some embodiments, the content source 104 sends more than one thumbnail container. For example, if the piece of content is longer than a threshold time (e.g., more than 150 minutes) the content source may send more than one thumbnail container. In some embodiments, the summary module 102 may request more than one thumbnail container based on the maximum time period associated with each of the first plurality of thumbnails 118a-118y. For example, the summary module may request that each thumbnail of the first plurality of thumbnails 118a-118y relate to increments one minute or less. Accordingly, if the piece of content is longer than 25 minutes, the summary module 102 may request more than one thumbnail container.

The summary module 102 can use the first thumbnail container 106 to identify one or more thumbnails of the first plurality of thumbnails 118a-118y that relate to one or more segments of a piece of content. The summary module 102 may identify the one or more thumbnails using a machine learning model. The summary module 102 may select the machine learning model from a plurality of machine learning models. The summary module 102 may select the machine learning model based on information corresponding to the user, characteristics corresponding to the device that displays and/or generates the summary 116, information corresponding to the piece of content, and/or similar such information. The summary module 102 identifies thumbnails based on the selected machine learning model. For example, if the machine learning model is trained using the user's preferences (e.g., likes animals) the machine learning model may identify a first thumbnail 118a because it corresponds to the user's preference (e.g., an animal is displayed in the identified thumbnail). In another example, if the machine learning model is trained using content information (e.g., war documentaries) the machine learning model may identify a second thumbnail 118b because it corresponds to the content information (e.g., a battle is displayed in the identified thumbnail).

In some embodiments, the summary module 102 sends a container request 108 to the content source 104. In some embodiments, the container request 108 comprises a time point associated with the thumbnail identified by the machine learning model. For example, the machine learning model may identify the first thumbnail 118a. The first thumbnail 118a may correspond to minute 12 of the piece of content. The container request may request an additional thumbnail container 110 comprising thumbnails between minute 11 and minute 13. In some embodiments, the container request 108 comprises a plurality of time points, wherein each time point of the plurality of time points correspond to a thumbnail identified by the machine learning model. For example, the machine learning model may identify the first thumbnail 118a and the third thumbnail 118c. The first thumbnail 118a may correspond to minute 12 of the piece of content and the third thumbnail 118c may correspond to minute 28 of the piece of content. The container request 108 may request thumbnail containers comprising thumbnails between minute 11 and minute 13 and thumbnail between minute 27 and minute 29.

In some embodiments, the content source 104 sends the additional thumbnail container 110 to the summary module 102. In some embodiments, the additional thumbnail container 110 comprises a second plurality of thumbnails 120a-120y. In some embodiments, the additional container 110 is the same as the first thumbnail container 106 except the second plurality of thumbnails 120a-120y relate to different increments than the first plurality thumbnail containers 118a-118y. In some embodiments, the time between each thumbnail of the second plurality of thumbnails 120a-120y is less than the time between each thumbnail of the first plurality of thumbnails 118a-118y. For example, each thumbnail of the first plurality of thumbnails 118a-118y may be five minutes apart and each thumbnail of the second plurality of thumbnails 120a-120y may be one minute apart.

In some embodiments, the summary module 102 repeats the process described above. For example, the summary module 102 uses the machine learning model to identify one or more thumbnails from the second plurality of thumbnails 120a-120y. In some embodiments, if the identified one or more thumbnails from the second plurality of thumbnails 120a-120y each correspond to a time period below a threshold (30 seconds), the summary module sends a segment request 112 to the content source 104. In some embodiments, the threshold is based on device restrictions, user preferences, etc. For example, a user may prefer longer segments in a summary in order for the user to have more context. Said user may indicate this preference to the summary module 102 and the summary module 102 may increase the threshold to a higher threshold (e.g., five minutes). In some embodiments, the threshold is based on the number of identified thumbnails. For example, if the machine learning model identifies many thumbnails then the threshold may be lower (e.g., 20 seconds). In some embodiments, if the identified thumbnails from the second plurality of thumbnails 120a-120y do not correspond to a time period below a threshold, the summary module sends a second content request to the content source 104. The second container request may request a second additional thumbnail container comprising an additional plurality of thumbnails, wherein, the time between each thumbnail of the additional plurality of thumbnails is less than the time between each thumbnail of the second plurality of thumbnails 120a-120y. In some embodiments, the summary module 102 repeats this process until the summary module 102 identifies a plurality of time frames of the piece of the content for the summary 116.

In some embodiments, the summary module 102 sends a segment request 112 to the content source 104. The segment request 112 may comprise one or more time frames identified by the summary module 102. In some embodiments, the time frames are based on the time points associated with the thumbnails identified by the machine learning model. For example, the summary module 102 may identify a first subset of thumbnails (e.g., 120k-120p) of the second plurality of thumbnails 120a-120y spanning from 11 minutes 20 seconds to 12 minutes 15 seconds. The summary module 102 may also identify a second subset of thumbnails (e.g., 120t-120y) of the second plurality of thumbnails 120a-120y spanning from 12 minutes 29 seconds to 13 minutes. The summary module 102 may then request a plurality of segments 114 corresponding to the identified time frames. For example, the summary module 102 may request a first segment 122 of the piece of content from 11 minutes 20 seconds to 12 minutes 15 seconds and a second segment 124 of the piece of content from 12 minutes 29 seconds to 13 minutes.

In some embodiments, the content source 104 sends the plurality segments 114 to the summary module 102. In some embodiments, the plurality of segments 114 comprise all the segments of the piece of content. In some embodiments, the plurality of segments 114 comprise only the segments requested by the summary module 102. The summary module 102 can receive the plurality of segments 114 and generate a summary 116 for display. In some embodiments, the summary module 102 requests a first plurality of segments (e.g., first segment 122 and second segment 124) of the piece of content from the content source 104 at a first resolution and requests a second plurality of segments (e.g., a third segment 126 and a fourth segment 128) of the piece of content from the content source 104 at a second resolution. The first plurality of segments may correspond to the time frames identified using the machine learning model. The first resolution may be higher than the second resolution because the first plurality of segments will be used to generate the summary 116 of the piece of content. The summary module 102 may provide different types of summaries of the piece of content. For example, the summary 116 may be generated so that segments of the piece of content of a higher resolution are played normally but segments of a lower resolution are fast-forwarded (e.g., the segments may be played at a faster rate (double, triple, etc.) compared to the normal rate of playback). In another example, the summary module 102 may generate the summary 116, wherein the summary 116 comprises the segments of the piece of content of the higher resolution but not the segments of the piece of content of the lower resolution.

Figure 2:
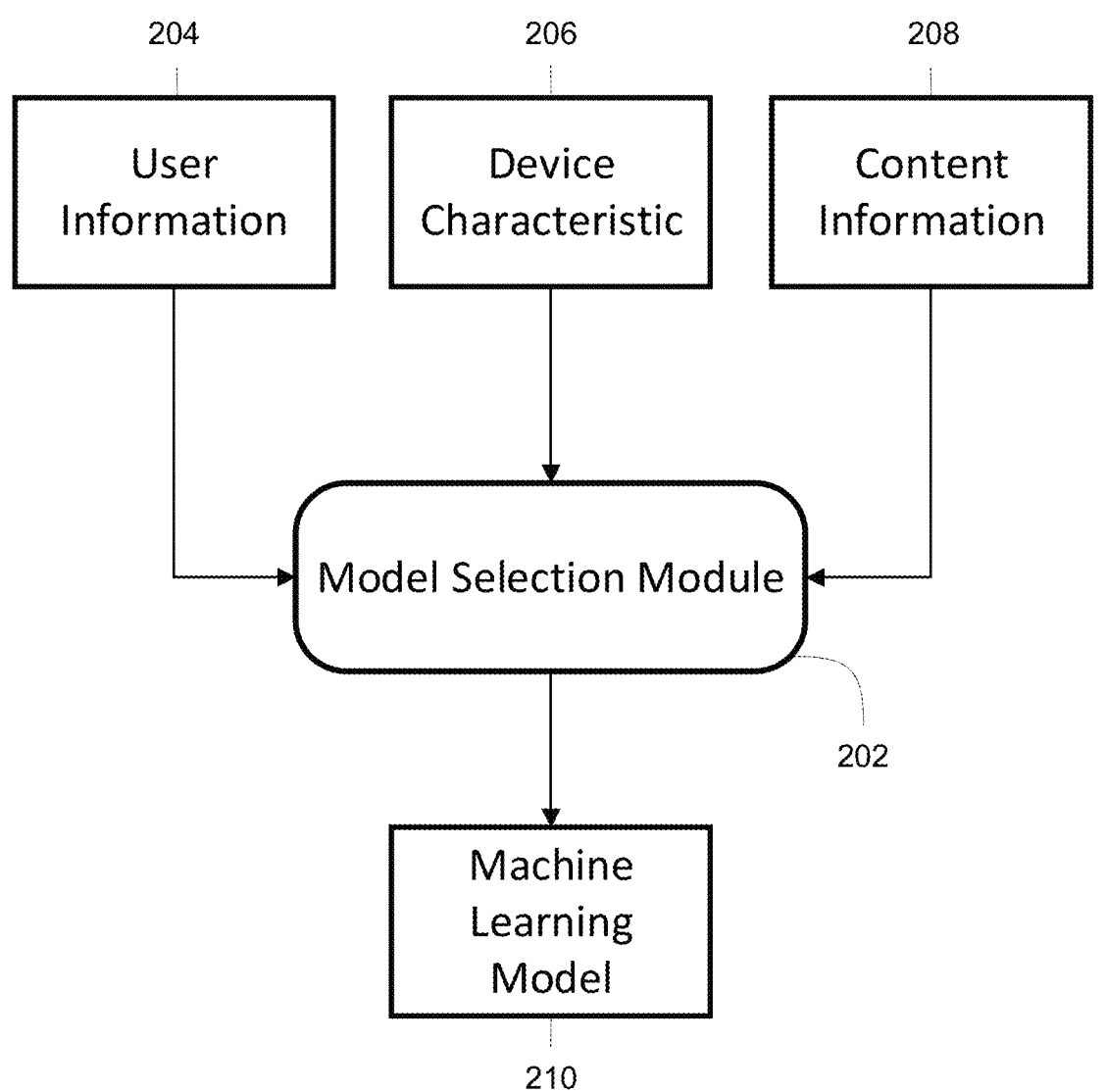
FIG. 2 shows an illustrative block diagram of a system for selecting a machine learning model, in accordance with embodiments of the disclosure.

FIG. 2 shows an illustrative block diagram of a system 200 for selecting a machine learning model 210, in accordance with some embodiments of the disclosure. In some embodiments, the model selection module (MSM) 202 receives user information 204, a device characteristic 206, and/or content information 208 and uses this information to select a machine learning model 210. In some embodiments, the MSM module 202 is stored on a device generating a summary of a piece of content. In some embodiments, the MSM 202 is stored on a first device generating the summary of the piece of content and receives user information 204, a device characteristic 206, and/or content information 208 from a second device. In some embodiments, the MSM module 202 is stored on a second device and receives user information 204, a device characteristic 206, and/or content information 208 from the first device that generates the summary of the piece of content.

In some embodiments, the user information 204 is associated with the user who requests the summary of the piece of content. In some embodiments, the user information 204 is collected by monitoring a user's consumption of media. The user information 204 may be inputted by a user. For example, a user may sign up for a user profile where the user indicates age, gender, ethnicity, address, preferences and/or similar such information. In some embodiments, the user information 204 is also used to train the machine learning model 210.

In some embodiments, the device characteristic 206 may correspond to one or more characteristics of the device generating the summary of the piece of content for the user. The device characteristic 206 may comprise the device location, device type, device specifications, and/or similar such information. For example, the device characteristic 206 may be that the device is located in the United States. In another example, the device characteristic 206 may be that the device is a smartphone. In some embodiments, one or more device characteristics 206 are detected based on User-Agent header, device ID, etc.

In some embodiments, the content information 208 is associated with the piece of content corresponding to the generated summary. The content information 208 may comprise the genre of the piece of content, the type of the piece of content, the length of the piece of content, and/or similar such information. For example, the content information 208 may be that the piece of content is movie. In another example, the content information 208 may be that the piece of content is an episodic series. In another example, the content information 208 may be that the piece of content is a comedy and/or is two hours long. In some embodiments, the content information 208 may be determined using meta-data associated with the piece of content.

In some embodiments, the MSM 202 has access to a plurality of machine learning models. For example, a plurality of machine learning models may be stored on the same device as the MSM 202. In another example, the plurality of machine learning models may be stored on a different device as the MSM 202. In some embodiments, the MSM 202 may have access to a database comprising a plurality of entries, wherein the entries associate machine learning models with types of user information 204, device characteristics 206, and/or content information 208. For example, a first machine learning model may be associated with movies and a second machine learning model may be associated with episodic programing. If the content information 208 corresponds to an episodic program, then the MSM 202 may identify the second machine learning model. In another example, a first machine learning model may be associated with a Wi-Fi connection and a second machine learning model may be associated with a cellular connection. If the device characteristic 206 corresponds to the device have a WI-FI connection, then the MSM 202 may identify the first machine learning model.

In some embodiments, one or more machine learning models are characterized based on the data used to train said model(s). For example, a first machine learning model may be trained with data comprising media of a first genre (e.g., martial arts) while a second machine learning model may be trained with data comprising a second genre (e.g., comedy). If the content information 208 corresponds to a comedy, then the MSM 202 may select the second machine learning model that was trained using similar such media. In some embodiments, one or more machine learning models correspond to more than one characteristic. For example, a first machine learning model may be trained with data comprising media of a first genre (e.g., martial arts) while also being trained with data relating to maturity ratings of a first country (e.g., United States). A second machine learning model may be trained with data comprising media of the first genre (e.g., martial arts) while also being trained with data relating to maturity ratings of a second country (e.g., France). If the content information 208 corresponds to a comedy and the device characteristic 206 corresponds to France, then the MSM 202 may select the second machine learning model that was trained using similar such media. In some embodiments, the machine learning model 210 is updated based on one or more user actions. For example, the machine learning model 210 may predict that a first segment of the piece of content will be of interest to a user. When the user views the first segment the user may input a command (e.g., skip the first segment) indicating that the first segment is not of interest to the user. In response to receiving the input indicting a discrepancy between the predicted outcome (e.g., first segment being of interest to the user) and a conflicting user action (e.g., skipping the first segment) the machine learning model may be updated. For example, one or more user inputs may be shared with a machine learning training service to create a new data set to train a new model and/or retrain an existing model.

In some embodiments, the MSM 202 receives the identified machine learning model 210 in response to a user accessing an interactive service (e.g., over-the-top video service). For example, when a user plays a movie and a playback API is invoked. In some embodiments, the machine learning model 210 is run on a programmatic interface (e.g., an API) or in a browser.

Figure 3:
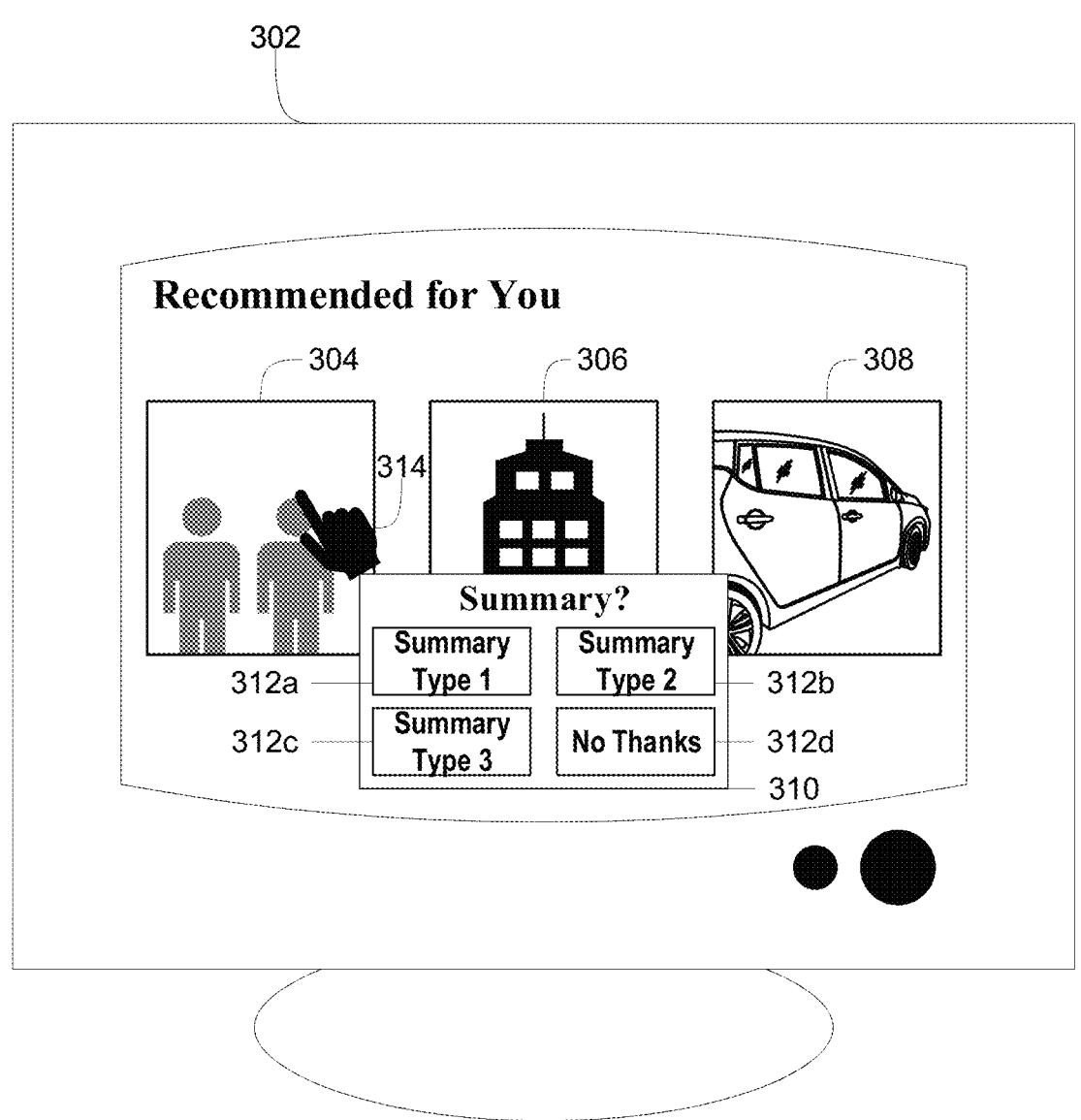
FIG. 3 shows an illustrative diagram of a device providing a summary interface for a piece of content, in accordance with embodiments of the disclosure.

FIG. 3 shows an illustrative diagram of a device 302 providing a summary interface for a piece of content 304, in accordance with embodiments of the disclosure. FIG. 3 shows a guide with a first piece of content 304, a second piece of content 306, and a third piece of content 308. In some embodiments, the device 302 displays pieces of media (e.g., first piece of content 304, second piece of content 306, and third piece of content 308 content) that are recommended for a user. In some embodiments, when a user hovers a cursor 314 over the first piece of content 304 the device displays a summary interface 310. The summary interface 310 comprises a first summary option 312a, a second summary option 312b, a third summary option 312c, and a fourth summary option 312d. In some embodiments, in response to the users selecting one of the summary options, the device 302 displays a summary for the user. Although four options are show, any number of options or interfaces may be used. For example, the summary interface 310 may be an icon or a plurality of icons. In some embodiments, the device 302 generates a summary in response to the selection of a summary option by the user.

In some embodiments, each summary option corresponds to a different summary. For example, the first summary option 312a may correspond to a summary where segments of the first piece of content 304 of a higher resolution are played normally but segments of a lower resolution are fast-forwarded. In another example, the first summary option 312a may correspond to a summary comprising only the segments of the first piece of content 304 of the higher resolution. In some embodiments, each summary is generated using a different machine learning model. For example, the first summary option 312a may correspond to a first summary generated using a first machine learning model and the second summary option 312b may correspond to a second summary generated using a second machine learning model. In some embodiments, each summary is generated using the same machine learning model. In some embodiments, the one or more machine learning models used to generate the summaries are prefetched (e.g., before the user selects the first piece of content 304). In some embodiments, the device 302 provides features based on the capability of a selected machine learning model. For example, the summary interface 310 may provide selectable icons (e.g., Play in Quick Mode, Play by Theme and then 'Action' or 'Car Races' can be selected, etc.) depending on the selected machine learning model. In some embodiments, an icon is only selectable if the selected machine learning model supports the corresponding functionality.

Figure 4:
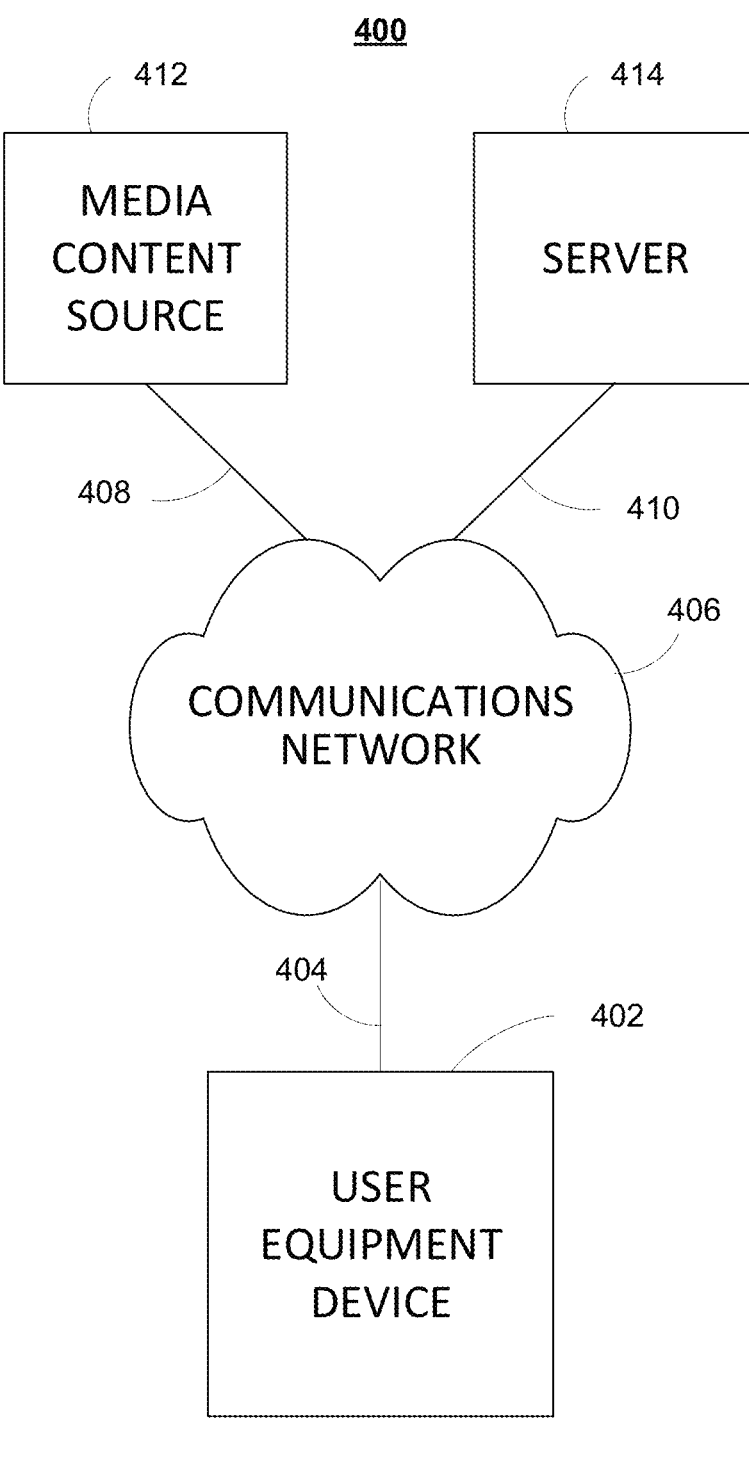
FIG. 4 shows an illustrative block diagram of a media system, in accordance with embodiments of the disclosure.
Figure 5:
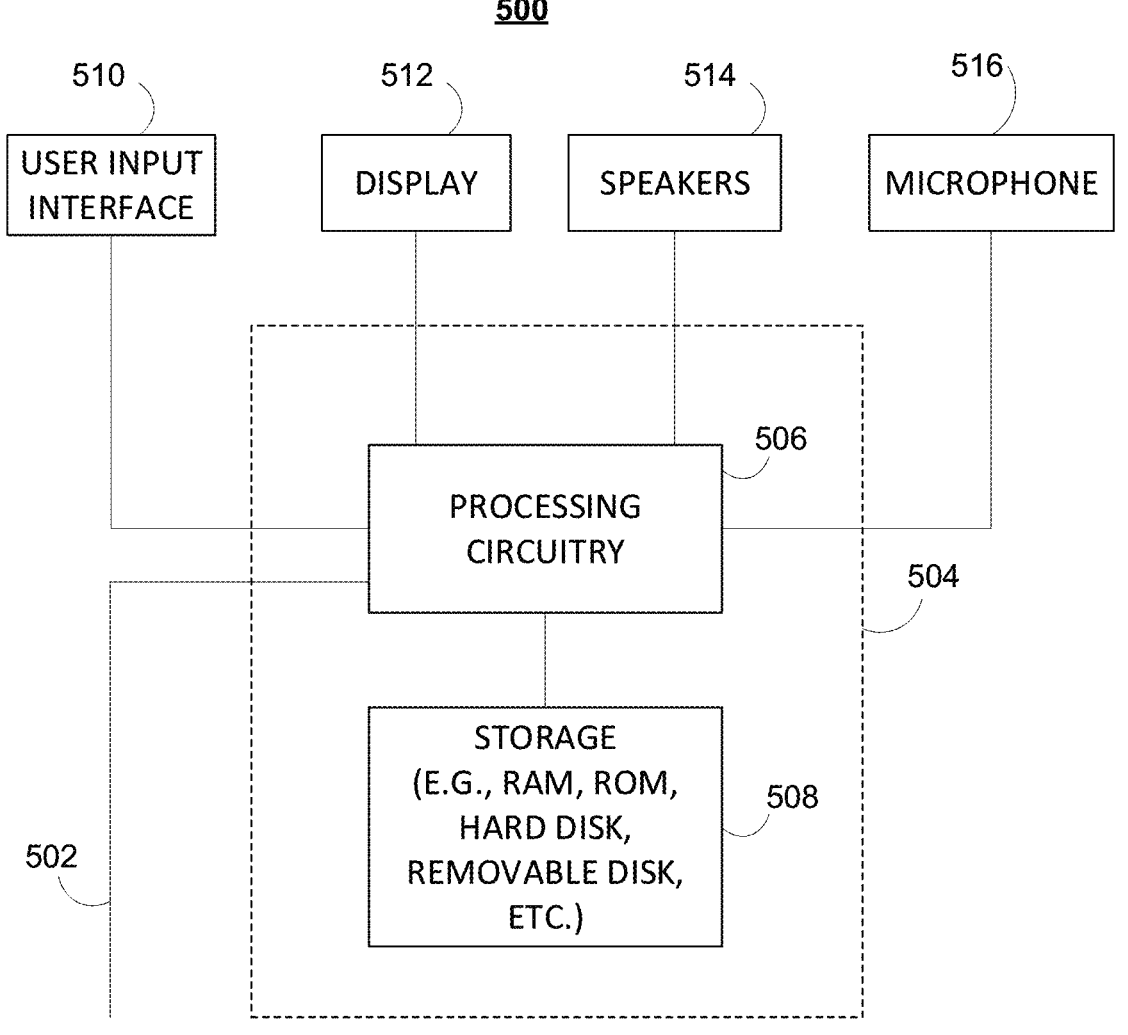
FIG. 5 shows an illustrative block diagram of a user equipment UE device system, in accordance with embodiments of the disclosure.

FIGS. 4-5 describe exemplary devices, systems, servers, and related hardware for generating a summary for a piece of content using a thumbnail container, in accordance with some embodiments of the enclosure. In the system 400, there can be more than one user equipment device 402, but only one is shown in FIG. 4 to avoid overcomplicating the drawing. In addition, a user may utilize more than one type of user equipment device and more than one of each type of user equipment device. In an embodiment, there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G, 5G, or LTE network), cable network, public switched telephone network, or other types of communications network or combinations of communications networks. The path 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment, path 404 can be a wireless path. Communications with the user equipment device 402 may be provided by one or more communications paths but is shown as a single path in FIG. 4 to avoid overcomplicating the drawing.

The system 400 also includes media content source 412, and server 414, which can be coupled to any number of databases providing information to the user equipment devices. The media content source 412 represents any computer-accessible source of content, such as a storage for audio content, metadata, or, similar such information. The server 414 may store and execute various software modules to implement the generating of a summary for a piece of content using a thumbnail container functionality. In some embodiments, the user equipment device 402, media content source 412, and server 414 may store metadata associated with a piece.

FIG. 5 shows a generalized embodiment of a user equipment device 500, in accordance with one embodiment. In an embodiment, the user equipment device 500 is the same user equipment device shown in FIG. 3 (e.g., 302) and/or FIG. 4 (e.g., 402). The user equipment device 500 may receive content and data via input/output ("I/O") path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry 506 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of supplemental content along with complex media segments functionality can be at least partially implemented using the control circuitry 504. The generating of a summary for a piece of content using a thumbnail container functionality described herein may be implemented in or supported by any suitable software, hardware, or combination thereof. The generating of a summary for a piece of content using a thumbnail container functionality can be implemented on user equipment, on remote servers, or across both.

In client/server-based embodiments, the control circuitry 504 may include communications circuitry suitable for communicating with one or more servers that may at least implement the described generating of a summary for a piece of content using a thumbnail container functionality. The instructions for carrying out the above-mentioned functionality may be stored on the one or more servers. Communications circuitry may include a cable modem, an integrated service digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing.

The user equipment device 500 may optionally include an interface 510. The interface 510 may be any suitable user interface, such as a remote control, mouse, trackball, keypad, keyboard, touchscreen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit.

The user equipment device 500 of FIG. 5 can be implemented in system 400 of FIG. 4 as user equipment device 402 and/or in system 300 of FIG. 3 as user equipment device 302, but any other type of user equipment suitable for generating a summary for a piece of content using a thumbnail container may be used. For example, user equipment devices such as television equipment, computer equipment, wireless user communication devices, or similar such devices may be used. User equipment devices may be part of a network of devices. Various network configurations of devices may be implemented and are discussed in more detail below.

FIG. 6 is an illustrative flowchart of a process 600 for generating a summary for a piece of content using a thumbnail container, in accordance with embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing the following processes may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that the following processes, or any step thereof, could be performed on, or provided by, any of the devices shown in FIGS. 1-5. Although the following processes are illustrated and described as a sequence of steps, it is contemplated that various embodiments of the following processes may be performed in any order or combination and need not include all the illustrated steps.

At 602, control circuitry requests a first thumbnail. In some embodiments, the request is sent to a media content source (e.g., content source 104). In some embodiments, the request identifies a piece of content. For example, a user may be browsing content and select an option to view a summary related to a piece of content. In response to the user's selection, the control circuitry can send the request identifying the piece of content to a media content source. In some embodiments, the control circuitry sends the request based on past user activity and/or watch history. For example, the control circuitry may recommend one or more pieces of content to a user based on the user's watch history and the control circuitry may request thumbnail containers associated with each piece of content of the one or more pieces of recommended content. In some embodiments, one or more devices (e.g., content source 104) automatically sends the first thumbnail container along with a piece of content identifier. For example, a device may send a plurality of identifiers, wherein each identifier corresponds to a piece of content, along with a plurality of thumbnail containers for each piece of content associated with the plurality of identifiers to the control circuitry. In some embodiments, the control circuitry may request more than one thumbnail container based on the maximum time period associated with each of the plurality of thumbnails. For example, the control circuitry may request that each thumbnail of the plurality of thumbnails relate to increments one minute or less.

At 604, control circuitry receives the first thumbnail container comprising a first plurality of thumbnails, wherein a first thumbnail of the first plurality of thumbnails is associated with a first time period. In some embodiments, the first thumbnail container comprises a plurality of thumbnails (e.g., plurality of thumbnails 118a-118y). In some embodiments the first thumbnail container comprises 25 thumbnails. In some embodiments, each thumbnail of the plurality of thumbnails may relate to a time period of the piece of content. For example, the piece of content may be 125 minutes long and each thumbnail of the plurality of thumbnails relates to a different five-minute increment of the piece of content. In some embodiments, the control circuitry receives more than one thumbnail container. For example, if the piece of content is longer than a threshold time (e.g., more than 150 minutes) the control circuitry may receive more than one thumbnail container.

At 606, control circuitry receives a machine learning model. In some embodiments, the control circuitry has access to a plurality of machine learning models. For example, a plurality of machine learning models may be stored in storage (e.g., storage 508). In some embodiments, the plurality of machine learning models are received from one or more devices (e.g., content source 104). In some embodiments, the control circuitry has access to a database comprising a plurality of entries, wherein the entries associate machine learning models with types of user information, device characteristics, and/or content information. For example, a first machine learning model may be associated with movies and a second machine learning model may be associated with episodic programing. In some embodiments, the control circuitry selects the machine learning model based on information corresponding to the user, characteristics corresponding to a device that displays and/or generates the summary, information corresponding to the piece of content, and/or similar such information. In some embodiments, the control circuitry selects the machine learning model by requesting a machine learning model from one or more other devices (e.g., content source 104).

At 608, control circuitry identifies a first thumbnail from the plurality of thumbnails using the machine learning model. In some embodiments, the control circuitry uses the machine learning model to identify one or more thumbnails of the plurality of thumbnails that relate to segments in the piece of content that can be used to a generate the summary. For example, if the machine learning model is trained using the user's preferences (e.g., likes animals) the control circuitry may identify a first thumbnail because the first thumbnail corresponds to the user's preference (e.g., an animal is displayed in the identified thumbnail). In another example, if the machine learning model is trained using content information (e.g., war documentaries) the control circuitry may identify a second thumbnail because the second thumbnail corresponds to the content information (e.g., a battle is displayed in the identified thumbnail).

At 610, control circuitry requests a first video segment at a first resolution and a second video segment at a second resolution, wherein the first video segment is associated with the first time period. In some embodiments, the first video segment corresponds to the time period of the first thumbnail identified using the machine learning model. In some embodiments, the first resolution is higher than the second resolution because the first video segment is of interest to the user.

At 612, control circuitry displays the first video segment at the first resolution and the second video segment at the second resolution. In some embodiments, the control circuitry generates a summary of the piece of content using the first video segment and the second video segment. In some embodiments, the control circuitry provides different types of summaries of the piece of content. For example, the control circuitry may generate a summary where segments of the piece of content of a higher resolution are played normally but segments of a lower resolution are fast-forwarded. In another example, the control circuitry may generate a summary comprising only the segments of the piece of content of the higher resolution.

FIG. 7 is another illustrative flowchart of a process 700 for generating a summary for a piece of content using a thumbnail container, in accordance with embodiments of the disclosure.

At 702, control circuitry receives a first thumbnail container comprising a first plurality of thumbnails, wherein a first thumbnail of the first plurality of thumbnails is associated with a time frame. In some embodiments, the first thumbnail container comprises a plurality of thumbnails (e.g., plurality of thumbnails 118*a*-118*y*). In some embodiments the first thumbnail container comprises 25 thumbnails. In some embodiments, each thumbnail of the plurality of thumbnails may relate to a time frame of the piece of content. For example, a first thumbnail may correspond to a first time frame from minute 1 to minute 10 of the piece of content and a second thumbnail may correspond to a second time frame from minute 10 to minute 20 of the piece of content. In some embodiments, the control circuitry receives more than one thumbnail container. In some embodiments, the control circuitry receives the first thumbnail container in response to sending a request. In some embodiments, the first thumbnail container is received from a media content source (e.g., content source 104).

At 704, control circuitry identifies a first thumbnail from the plurality of thumbnails using a machine learning model. In some embodiments, the machine learning model is received using the same or similar methodologies as described in step 606 above. In some embodiments, the machine learning model identifies the first thumbnail using the same or similar methodologies as described in step 608 above.

At 706, control circuitry requests a second thumbnail container associated with the time frame. In some embodiments, the request comprises the time frame associated with the first thumbnail identified by the control circuitry using the machine learning model. For example, the control circuitry may identify the first thumbnail corresponding to a time frame from minute 1 to minute 10 of the piece of content. The control circuitry can request a second thumbnail container comprising thumbnails associated with time period between minute 1 and minute 10 of the piece of content.

At 708, control circuitry receives the second thumbnail container comprising a second plurality of thumbnails. In some embodiments, each thumbnail of the second plurality of thumbnails relates to a time period of the piece of content, wherein the time periods are within the time frame. For example, if the time frame is between minute 1 and minute 10, the first thumbnail of the second plurality of thumbnails may relate to minute 1 and the second thumbnail of the second plurality of thumbnails may relate to minute 2. In some embodiments, the second thumbnail container is similar to the first thumbnail container, except the second plurality of thumbnails relate to different increments than the first plurality thumbnail containers. In some embodiments, the time between each thumbnail of the second plurality of thumbnails is less than the time between each thumbnail of the first plurality of thumbnails.

At 710, control circuitry identifies a second thumbnail associated with a first time period and a third thumbnail associated with a second time period from the second plurality of thumbnails. In some embodiments, the machine learning model identifies the second thumbnail and the third thumbnail using the same or similar methodologies as described in step 608 above.

At 712, control circuitry requests a first video segment at a first resolution and a second video segment at a second resolution, wherein the first video segment is associated with the first time period and the second time period. In some embodiments, the control circuitry requests a video segment at a first resolution spanning from the first time period to the second time period. In some embodiments, the first time period and the second time period are identified because the second and third thumbnails were identified by the machine learning model in step 710. For example, the control circuitry may identify the second thumbnail of the second plurality of thumbnails spanning from 2 minutes to 3 minutes. The control circuitry may also identify the third thumbnail spanning from 3 minutes to 4 minutes. The control circuitry may then request the first segment spanning from 2 minutes to 4 minutes.

At 714, control circuitry displays the first video segment at the first resolution and the second video segment at the second resolution. In some embodiments, the control circuitry displays the first video segment and the second video segment using the same or similar methodologies as described in step 606 above.

Figure 8:
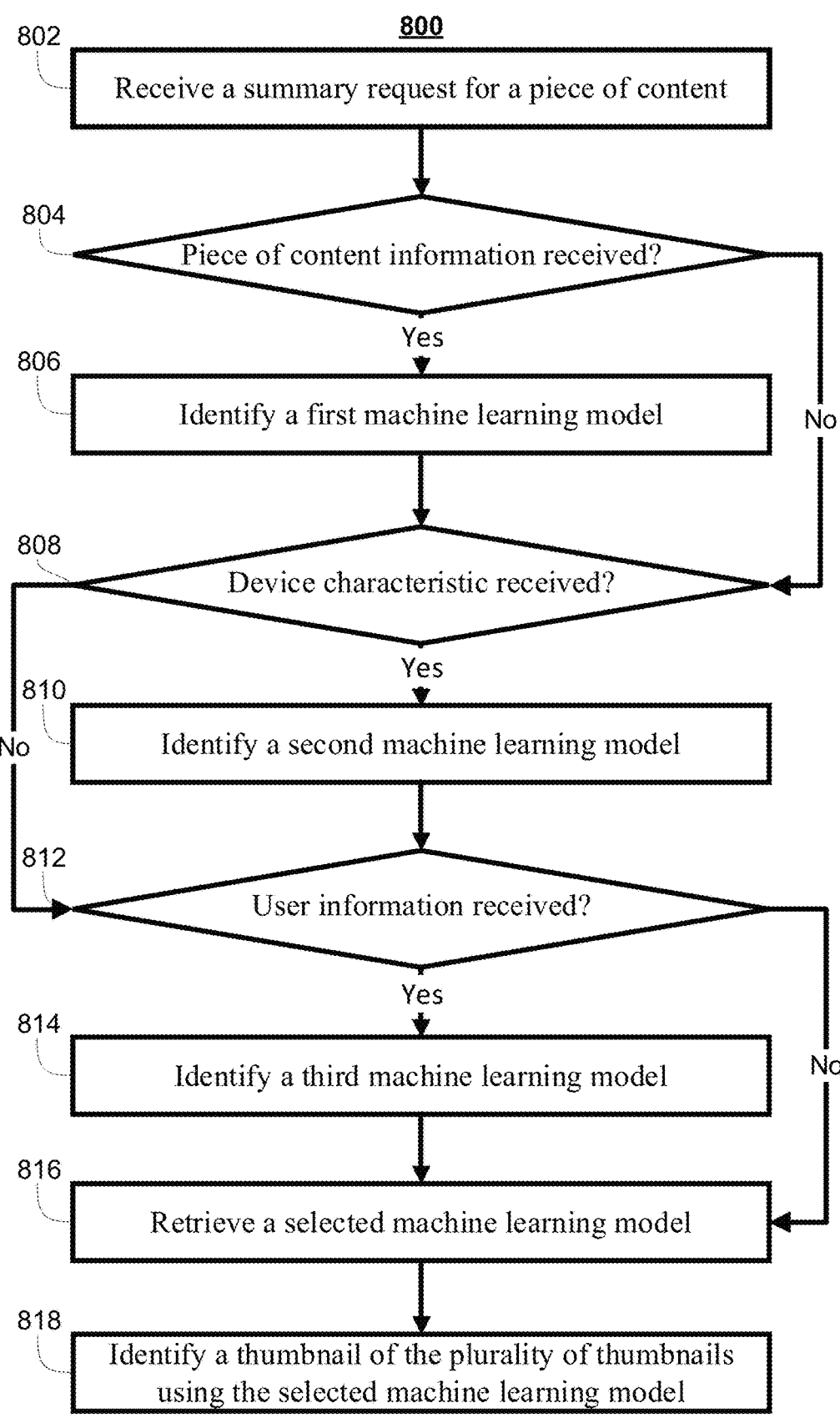
FIG. 8 is an illustrative flowchart of a process for selecting a machine learning model for generating a summary for a piece of content using a thumbnail container, in accordance with embodiments of the disclosure.

FIG. 8 is an illustrative flowchart of a process 800 for selecting a machine learning model for generating a summary for a piece of content using a thumbnail container, in accordance with embodiments of the disclosure.

At 802, the control circuitry receives a summary request for a piece of content. In some embodiments, the request is generated by a user input. For example, a user may be browsing content and select an option to view a summary related to a piece of content. The selecting of the option may result in the control circuitry receiving a summary request for the piece of content. In another example, a user may launch an application and the launching of the application results in the control circuitry receiving a summary request for one or more pieces of content. In another example, a user may repeat an action (e.g., fast forward, skip, rewind, etc.) when viewing a piece of media content. Repeating an input may result in the control circuitry receiving a summary request for the pieces of content.

At 804, the control circuitry determines whether content information has been received. In some embodiments, the content information is associated with the piece of content and is determined using metadata associated with the piece of content. In some embodiments, the content information comprises the genre of the piece of content, the type of the piece of content, the length of the piece of content, and/or similar such information. For example, the content information may be that the piece of content is movie. In another example, the content information may be that the piece of content is an episodic series. In another example, the content information may be that the piece of content is a comedy and/or is two hours long. If the control circuitry determines that content information is not received, the process 800 continues to step 808. If the control circuitry determines that content information has been received, the process 800 continues to step 806.

At 806, the control circuitry identifies a first machine learning model. In some embodiments, the control circuitry identifies the first machine learning model from a plurality of machine learning models. In some embodiments, the control circuitry accesses a database comprising a plurality of entries, wherein the entries associate machine learning models with types of user information, device characteristic, and/or content information. In some embodiments, the control circuitry identifies one or more machine learning models based on the received content information. In some embodiments, the control circuitry only identifies one machine learning model, wherein the identified machine learning model most closely relates to the received content information. For example, the piece of content may correspond to a comedy movie (content information). If a first machine learning model is generally associated with comedy while a second machine learning model is associated with movies that are comedies, the control circuitry can select the second machine learning model because the second machine learning model more closely relates to the received content information.

At 808, the control circuitry determines whether a device characteristic has been received. In some embodiments, the device characteristic may correspond to one or more characteristics of the device generating the summary of the piece of content. In some embodiments, one or more device characteristics of the device are detected based on User-Agent header, device ID, and/or similar such methodologies. In some embodiments, the device characteristic comprises the device location, device type, device specifications, and/or similar such information. For example, a device characteristic may be that the device is located in the United States. In another example, a device characteristic may be that the device is a smartphone. If the control circuitry determines that device information has not been received, the process 800 continues to step 814. If the control circuitry determines that device information has been received, the process 800 continues to step 810.

At 810, the control circuitry identifies a second machine learning model. In some embodiments, the control circuitry identifies the second machine learning model from a plurality of machine learning models. In some embodiments, the control circuitry accesses a database comprising a plurality of entries. In some embodiments, the database is the same database described in step 806 above. In some embodiments, the control circuitry identifies one or more machine learning models based on the received device characteristic. In some embodiments, the control circuitry only identifies one machine learning model, wherein the identified machine learning model most closely relates to the received device characteristic.

At 812, the control circuitry determines whether user information has been received. In some embodiments, a user profile comprises user information and the control circuitry determines the user profile associated with the device that requested the summary of the piece of content. In some embodiments, the user information is collected by monitoring a user's consumption of media. In some embodiments, the user information is inputted by a user. For example, a user may sign up for a user profile where the user indicates age, gender, ethnicity, address, preferences and/or similar such information. If the control circuitry determines that user information has not been received, the process 800 continues to step 816. If the control circuitry determines that user information has been received, the process 800 continues to step 814.

At 814, the control circuitry identifies a third machine learning model. In some embodiments, the control circuitry identifies the third machine learning model from a plurality of machine learning models. In some embodiments, the control circuitry accesses a database comprising a plurality of entries. In some embodiments, the database is the same database described in step 806 above. In some embodiments, the control circuitry identifies one or more machine learning models based on the received user information. In some embodiments, the control circuitry only identifies one machine learning model, wherein the identified machine learning model most closely relates to the received user information.

At 816, the control circuitry receives a selected machine learning model. In some embodiments, control circuitry receives one or more of the machine learning models identified in steps 806, 810, and/or 814. In some embodiments, the control circuitry receives a selected machine learning model in response to selecting a machine learning model. In some embodiments, the control circuitry selects a machine learning model based on rankings associated with the identified machine learning model. For example, a first machine learning model associated with the user information may be ranked higher than a second machine learning model associated with the content information because the first machine learning model may result in summaries more reflective of a user's preferences. In some embodiments, the control circuitry selects a machine learning model based on characteristics of the identified machine learning model. For example, a first machine learning model may be associated with comedy (e.g., content information) while a second machine learning model may be associated with comedy and smartphones (e.g., device characteristic). The control circuitry may select the second machine learning model because the second machine learning model is more specifically associated with the device generating the summary (e.g., smartphone) and the piece of content used to generate the summary. In some embodiments, if only one machine learning model is identified in steps 806, 810, and 814, then the control circuitry retrieves said machine learning model. In some embodiments, if no machine learning models are identified in steps 806, 810, and 814, the control circuitry may retrieve a default machine learning model.

At 818, the control circuitry identifies a thumbnail of the plurality of thumbnails using the selected machine learning model. In some embodiments, the control circuitry identifies the thumbnail using the same or similar methodologies as described in step 608 above.

It is contemplated that some suitable steps or suitable descriptions of FIGS. 6-8 may be used with other suitable embodiments of this disclosure. In addition, some suitable steps and descriptions described in relation to FIGS. 6-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-8.

The processes discussed above are intended to be illustrative and not limiting. For instance, the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a request to view, via a device, a summary of a piece of media content;

selecting a machine learning model based at least in part on content information determined for the piece of media content and based at least in part on a location of the device or a characteristic of the device;

determining, based at least in part on a first output by the selected machine learning model, that a first image of the piece of media content is relevant to the summary of the piece of media content, wherein the first image is within a time frame in the piece of media content;

based at least in part on the determining that the first image is relevant to the summary, requesting a second image in the time frame within the piece of media content and a third image within the time frame in the piece of media content, wherein the second image is at a first time within the time frame and the third image is at a second time within the time frame;

determining, based at least in part on a second output by the selected machine learning model, that the second image is relevant to the summary of the piece of media content;

determining, based at least in part on a third output by the selected machine learning model, that the third image is relevant to the summary of the piece of media content; and based at least in part on the determining that the second image is relevant to the summary of the piece of media content and the determining that the third image is relevant to the summary of the piece of media content, causing display of the summary of the piece of media content based at least in part on video content at the first time in the piece of media content and the second time in the piece of media content.

2. The method of claim 1, wherein the second image and the third image are requested as part of a same thumbnail container.

3. The method of claim 1, wherein the second image and the third image each comprise a thumbnail.

4. The method of claim 1, wherein the machine learning model is selected based at least in part on a genre of the piece of media content.

5. The method of claim 1, wherein the location of the device is selected according to a country or jurisdiction in which the device is present.

6. The method of claim 1, wherein the machine learning model is selected based at least in part on a user profile associated with the device.

7. The method of claim 1, wherein the request to view the summary is generated based at least in part on a fast forward user interface request.

8. The method of claim 1, wherein the request to view the summary is generated based at least in part on a rewind user interface request.

9. The method of claim 1, wherein the method further comprises:

identifying a first video segment at the first time and the second time within the time frame in the piece of media content;

wherein the causing the display of the summary of the piece of media content comprises displaying the first video segment.

10. The method of claim 9, wherein the first video segment is displayed at a first resolution, and wherein the method comprises:

identifying a second video segment within the time frame; and causing the display of the second video segment at a second resolution lower than the first resolution.

11. A system comprising:

a memory; and control circuitry configured to:

receive a request to view, via a device, a summary of a piece of media content;

select a machine learning model based at least in part on content information determined for the piece of media content and based at least in part on a location of the device or a characteristic of the device;

determine, based at least in part on a first output by the selected machine learning model, that a first image of the piece of media content is relevant to the summary of the piece of media content, wherein the first image is within a time frame in the piece of media content, and store the time frame in the memory;

based at least in part on the determining that the first image is relevant to the summary, request a second image in the time frame within the piece of media content and a third image within the time frame in the piece of media content, wherein the second image is at a first time within the time frame and the third image is at second time within the time frame;

determine, based at least in part on a second output by the selected machine learning model, that the second image is relevant to the summary of the piece of media content;

determine, based at least in part on a third output by the selected machine learning model, that the third image is relevant to the summary of the piece of media content;

based at least in part on the determining that the second image is relevant to the summary of the piece of media content and the determining that the third image is relevant to the summary of the piece of media content, cause display of the summary of the piece of media content based at least in part on video content at the first time in the piece of media content and the second time in the piece of media content.

12. The system of claim 11, wherein the second image and the third image are requested as part of a same thumbnail container.

13. The system of claim 11, wherein the second image and the third image each comprise a thumbnail.

14. The system of claim 11, wherein the machine learning model is selected based at least in part on a genre of the piece of media content.

15. The system of claim 11, wherein the location of the device is selected according to a country or jurisdiction in which the device is present.

16. The system of claim 11, wherein the machine learning model is selected based at least in part on a user profile associated with the device.

17. The system of claim 11, wherein the request to view the summary is generated based at least in part on a fast forward user interface request.

18. The system of claim 11, wherein the request to view the summary is generated based at least in part on a rewind user interface request.

19. The system of claim 11, wherein the system is configured to:

identify a first video segment at the first time and the second time within the time frame in the piece of media content;

wherein the causing the display of the summary of the piece of media content comprises displaying the first video segment.

20. The system of claim 19, wherein the first video segment is displayed at a first resolution, and wherein the system is configured to:

identify a second video segment within the time frame; and cause the display of the second video segment at a second resolution lower than the first resolution.

* * * * *